(12) United States Patent  
Schoeman

(10) Patent No.: US 8,714,606 B2  
(45) Date of Patent: May 6, 2014

(54) LOCKING TONG

(71) Applicant: John Louis Schoeman, Mona Vale (AU)

(72) Inventor: John Louis Schoeman, Mona Vale (AU)

(73) Assignee: Masterful Limited, Hong Kong (HK)

( * ) Notice: Subject to any disclaimer, the term of this patent is extended or adjusted under 35 U.S.C. 154(b) by 0 days.

(21) Appl. No.: 13/625,965

(22) Filed: Sep. 25, 2012

(65) Prior Publication Data

US 2014/0084615 A1    Mar. 27, 2014

(51) Int. Cl.
*B65G 7/12* (2006.01)
*B65G 9/00* (2006.01)

(52) U.S. Cl.
USPC .............................. 294/16; 294/99.2; 294/106

(58) Field of Classification Search
USPC .............. 294/16, 99.2, 28, 106; D7/393, 686
See application file for complete search history.

(56) References Cited

U.S. PATENT DOCUMENTS

| | | | |
|---|---|---|---|
| 2,111,195 A * | 3/1938 | Hans Skau ........................ 7/126 |
| 2,864,645 A * | 12/1958 | Meldrum ...................... 294/106 |
| 3,934,915 A * | 1/1976 | Humpa ......................... 294/99.2 |
| 5,199,756 A * | 4/1993 | Bartlett et al. .................. 294/16 |
| 6,536,819 B2 * | 3/2003 | Wang et al. ..................... 294/16 |
| 7,311,344 B2 * | 12/2007 | Kerr et al. ....................... 294/16 |
| 7,448,660 B2 * | 11/2008 | Yamanaka et al. .............. 294/16 |
| 2008/0088142 A1 * | 4/2008 | Lubenesky et al. ............. 294/16 |

* cited by examiner

*Primary Examiner* — Stephen Vu  
(74) *Attorney, Agent, or Firm* — Benesch, Friedlander, Coplan & Aronoff LLP

(57) ABSTRACT

Certain embodiments of tongs are disclosed herein having a locking feature disposed upon an arm thereof.

18 Claims, 3 Drawing Sheets

LOCKING TONG

CLAIM OF PRIORITY

This is the first filing made with the USPTO by the applicant regarding the present disclosure.

BACKGROUND/FIELD

Within the field of food preparation, it is often advantageous to store or use cooking tongs in a locked position, wherein the respective arms of the tongs are lockably engaged upon one another at a fixed distance. The majority of these are cumbersome and frustrating in use and require both hands of an operator to configure into a "locked" condition or release to an "open" condition.

Consequently, improved locking tongs operable with a single hand are disclosed herein.

SUMMARY

According to certain embodiments of the present disclosure, a locking tong includes a first and second elongated arm pivotably coupled near the proximal-end portions thereof with a biasing member inserted therebetween urging the arms apart, wherein at least one arm has an enlarged distal-end portion sized and shaped for manipulating food thereby defining a head; there is a claw pivotably coupled to the first arm near the proximal-end portion of the claw about an axis in substantially orthogonal relation to the long axis of the arm and the distal-end portion of the claw has a hook disposed thereupon; there is an engagement portion disposed upon the second arm sized and shaped to releasably retain the hook therein; such that the latch is engageable upon the clasp, the arms are releasably retained in a closed position.

According to further embodiments of the present disclosure, a locking tong may also include lateral slots traversing in at least one of the heads.

According to further embodiments of the present disclosure, a locking tong may also include repeating arcuate edge formed into a side of the head.

According to further embodiments of the present disclosure, a locking tong may also include portions of silicone overmolding about the distal-end portion of the arms enclosing a significant portion of the heads.

According to further embodiments of the present disclosure, the head of the second arm has an enlarged cross-section at the proximal end thereof sized and shaped to aide in the manipulation of food.

According to further embodiments of the present disclosure, a locking tong may also include the interior face of at least one of the heads has a modified surface treatment disposed thereupon to increase the holding force of the head upon food, with the surface treatment being selected from one of the following; an emboss, a detent, a pattern of embosses, and a pattern of detents.

According to further embodiments of the present disclosure, the claw further comprises a biasing member urging the hook towards the clasp.

According to further embodiments of the present disclosure, a locking tong may also include a locking mechanism wherein the clasp is disposed at a distal offset from the latch.

According to further embodiments of the present disclosure, the proximal-end portion of the second arm is substantially disposed within the proximal-end portion of the first arm.

According to further embodiments of the present disclosure, there is an aperture disposed within the proximal-end portion of first arm.

According to further embodiments of the present disclosure, the arms are elongated channels having a substantially c-shaped cross-section.

BRIEF DESCRIPTION OF THE FIGURES

In the figures, which are not necessarily drawn to scale, like numerals describe substantially similar components throughout the several views. The drawings illustrate generally, by way of example, but not by way of limitation, various embodiments discussed in the claims of the present document.

DETAILED DESCRIPTION OF THE FIGURES

Figure 1:
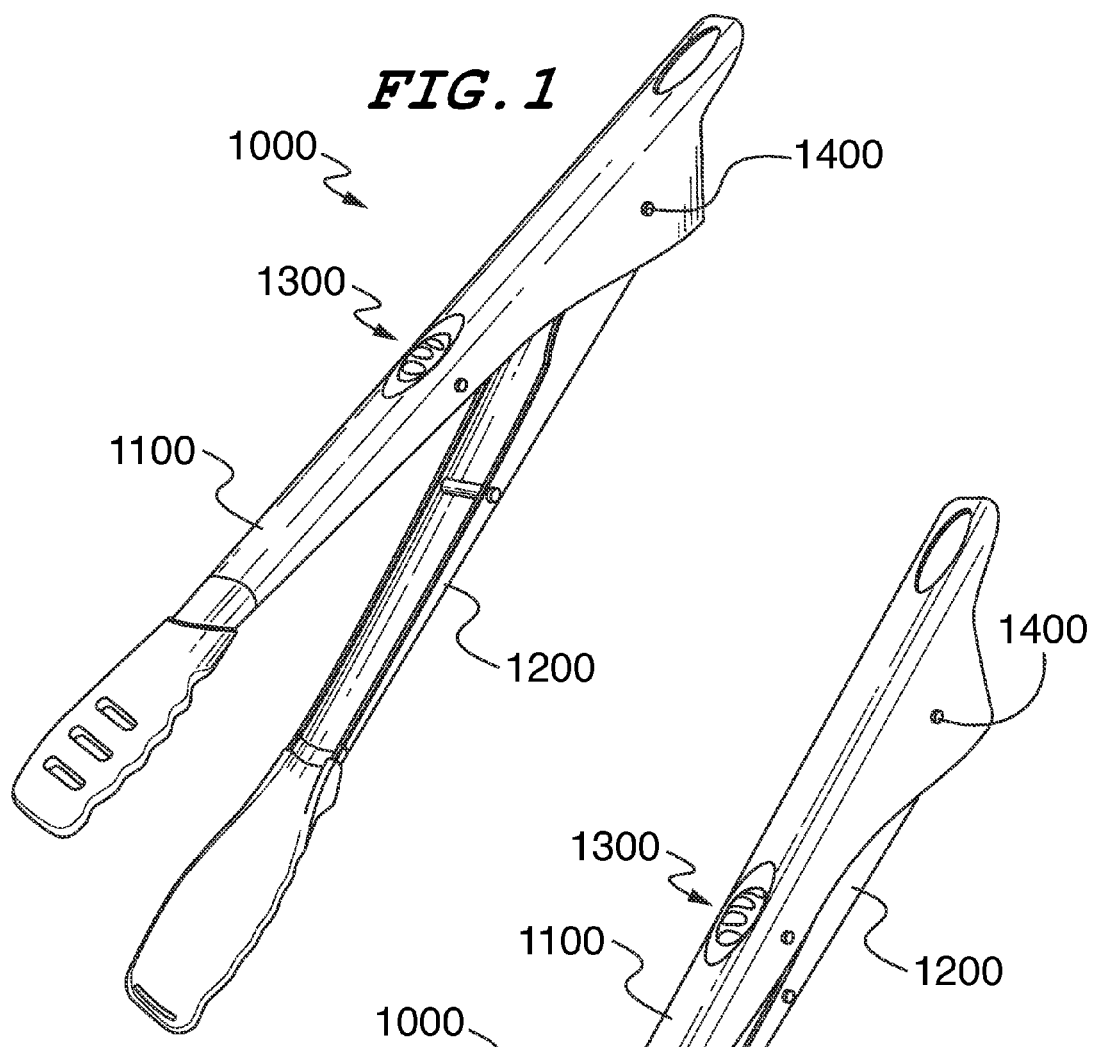
FIG. 1 shows an assembled isometric view of a locking tong in a first "open" condition.

Various embodiments of the presently disclosed apparatus will now be described in detail with reference to the drawings, wherein like reference numerals identify similar or identical elements. In the drawings and in the description that follows, the term "proximal," will refer to the end of a device or system that is closest to the operator, while the term "distal" will refer to the end of the device or system that is farthest from the operator. Similar, anatomical terms of reference such as dorsal, lateral, anterior, and sagittal shall have their accepted meanings in the arts.

Referring now to FIG. 1, a first embodiment of a locking tong 1000 is shown, wherein the tong 1000 is comprised of a first arm 1100, a second arm 1200, a clasp assembly 1300, and a hinge assembly 1400.

Figure 3:
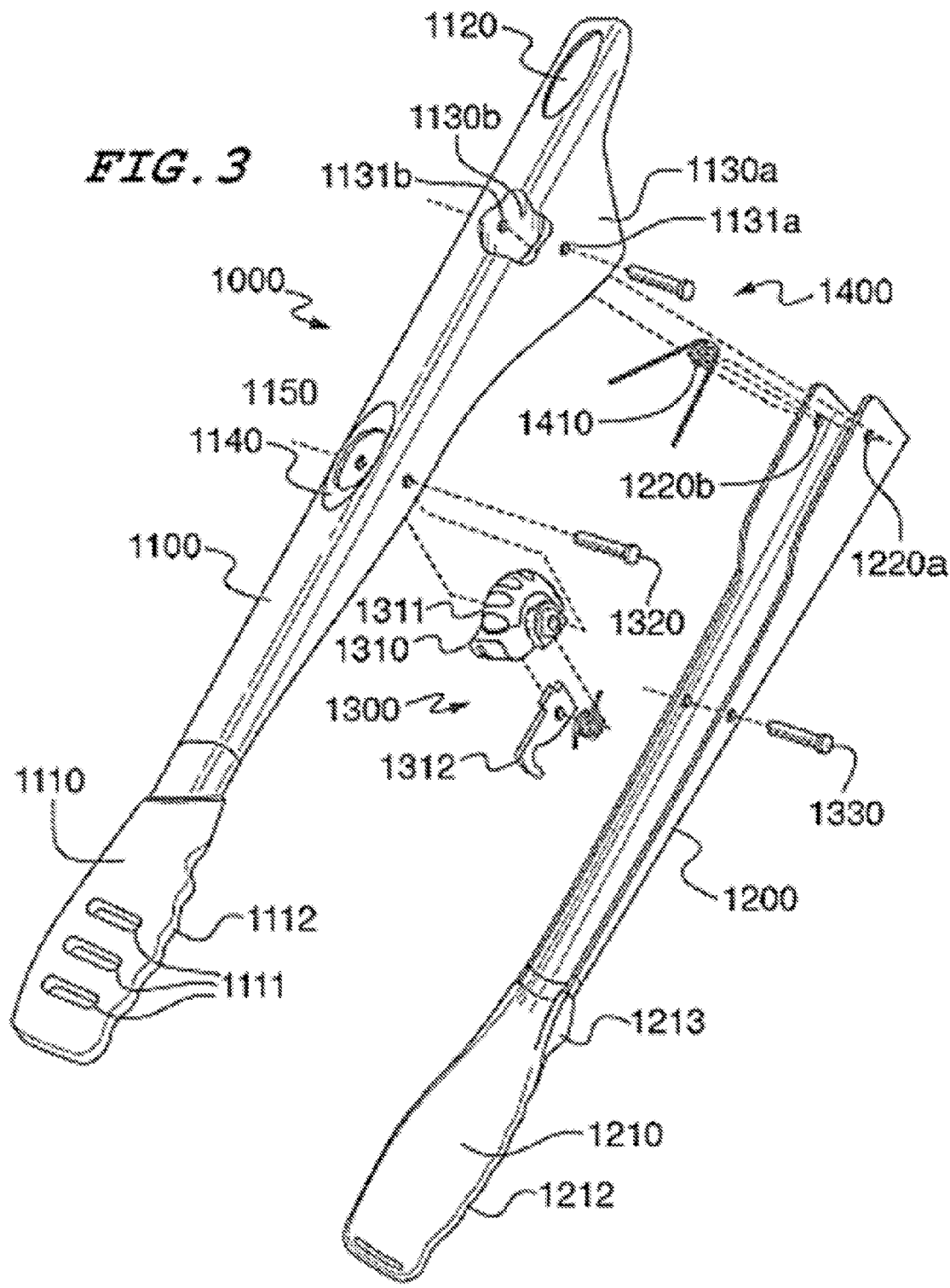
FIG. 3 shows an isometric exploded view of a locking tong.
Figure 4:
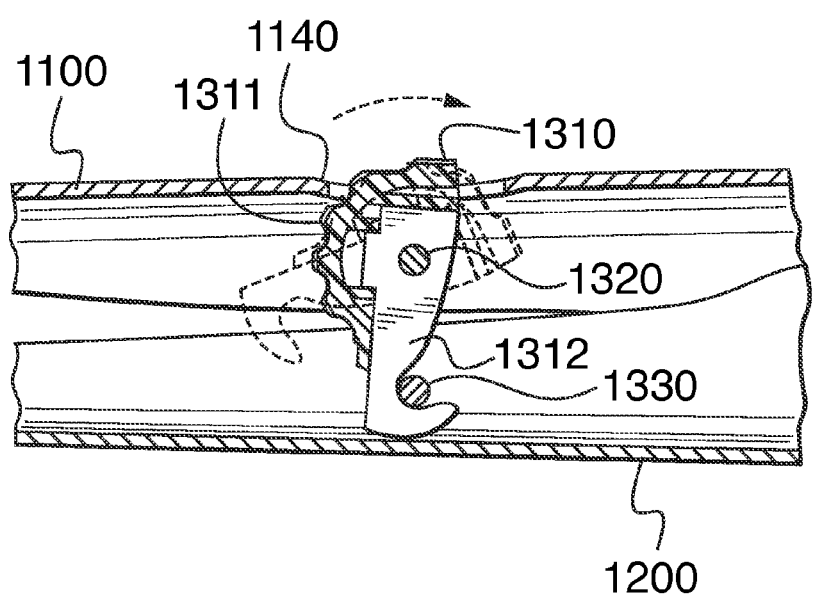
FIG. 4 shows a cut-away view of a clasp assembly.

Referring now to FIG. 3, first arm 1100 is an elongated member formed from a portion of rigid material, including for instance metal, plastic, or wood shaped into a substantially c-shaped cross-section. Upon the proximal end of first arm 1100, there is an aperture 1120 sized and shaped to enable the device to be hung from a hook or hanger. Further, there are enlarged ventrally-extending projections 1130(*a* and *b*) disposed upon the proximal-end portion of first arm 1100. Projections 1130(*a* and *b*) have apertures 1131(*a* and *b*) extending therethrough sized and shaped to retain a complementary pin assembly 1400 therein.

With continued reference to FIG. 3, there is a substantially dorsal-facing detent 1140 disposed upon the medial portion of arm 1100. Detent 1140 has an aperture 1150 disposed therein sized and shaped to rotably retain clasp 1300 therewithin. Upon the distal end portion of first arm 1100, there is disposed a head 1110. Head 1110 has an enlarged diameter relative to the remainder of the arm and has structures disposed thereupon sized and shaped to aid in the capture and manipulation of food. These structures include, but are not limited to silicone or other engineered rubber overmolding as shown in the figures, wood, metal, or plastic. Further, a modified forward edge 1112 having a waved form, and traverse lateral slits 1111.

Second arm 1200 is an elongated member formed from a portion of rigid material, including for instance metal, plastic, or wood shaped into a substantially c-shaped cross-section. There are apertures 1220(*a* and *b*) laterally traversing the proximal end-portion of arm 1200. Further, the proximal-end portion of arm 1200 is than the corresponding proximal-end portion of arm 1100, such that when the two are assembled via a pin, screw, or rivet through apertures 1220(*a* and *b*) and 1131(*a* and *b*), the proximal-end portion of second arm 1200 is disposed within the proximal-end portion of first arm 1100 thereby reducing the likelihood of impingement of an operator's hand as the device is used. There is a biasing member 1410 disposed within the juncture of arms 1100 and 1200 which urges the distal ends of the arms apart.

With continued reference to the second arm 1200, upon the distal end portion of second arm 1200, there is a head 1210. Head 1210 has an enlarged relative diameter relative to the remainder of the arm and has structures disposed thereupon sized and shaped to aid in the capture and manipulation of food. These include, but are not limited to silicone, or other engineered rubber overmolding as shown in the figures, a modified forward edge 1212 having a waved form, and traverse lateral slits 1211. Further, upon the portion of overmolding there is an segment 1213 about the proximal-end portion of head 1210 extending ventrally sized and shaped to affect the manipulation of food using the device.

The motion and retention of arm 1200 relative to arm 1100 is mediated and restricted by clasp assembly 1300. Clasp assembly 1300 comprises a clasp body 1310, a first pin 1320, and a second pin 1330. First pin 1320 laterally traverses the medial portion of first arm 1100 and second pin 1330 laterally traverses the medial portion of second arm 1200. Clasp body 1310 is a substantially rigid member pivotably coupled about first pin 1320. Clasp body 1310 has an enlarged proximal-end portion 1311 with disposed thereupon to improve the grip of said member upon the digit of an operator. Clasp body 1310 further has a rigid hook 1312 extending distally from 1311 sized and shaped to be engaged upon second pin 1330. There is a biasing member disposed upon the joint of clasp assembly 1300 and arm 1100 urging the distal end portion of clasp assembly 1300 in a dorsal direction.

Figure 2:
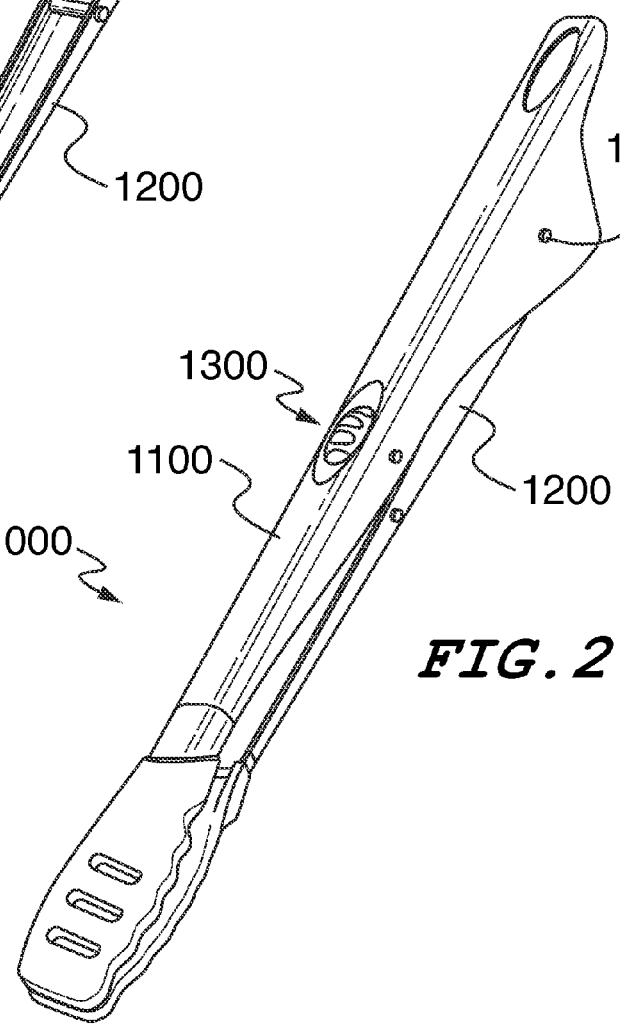
FIG. 2 shows an assembled isometric view of a locking tong in a second "closed" condition.

A method of unlocking and locking will now be described;

Initially, the tong is provided in a first, closed condition as shown in FIG. 2. Next, the tong is grasped in the hand of an operator, with the proximal-end portion of the tong abutting the operator's palm and the operator's thumb resting on the medial portion of the first arm 1100 behind and not obstructing the clasp assembly 1300 with the operator's fingers wrapped about the second arm 1200. Next, the operator compresses the second arm 1200 relative to the first arm 1100 thereby decreasing the distance therebetween such that the distal-end portion of clasp assembly 1300 is no longer engaged upon second pin 1320. The clasp assembly 1300 translates towards first arm 1100 upon the urging of biasing member of clasp assembly 1300. Next, the operator eases his grasp upon second arm 1200, thereby allowing the arms 1100 and 1200 to separate upon the urging of biasing member 1410. This configures the tongs into a second, open state as shown in FIG. 1.

To return the tong to its initial state, the tong is provided in a second, opened condition as shown in FIG. 1. Next, the tong is grasped in the hand of an operator, with the proximal-end portion of the tong abutting the operator's palm and clasp assembly 1300 resting below the operator's thumb with the operator's fingers wrapped about the second arm 1200. Next, the operator increases his grasp upon second arm 1200, thereby allowing the arms 1100 and 1200 to close upon the urging of biasing member 1410. Next, the operator rests his thumb upon the proximal-end portion 1311 of clasp body 1310 and translates it proximally, thereby translating rigid hook 1312 towards second arm 1200. The rigid hook 1312 will engage on second pin 1320. Next, the operator eases his grasp upon second arm 1200, thereby allowing the arms 1100 and 1200 to remain in closed condition as shown in FIG. 2.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A locking tong comprising:
   a first elongated arm and a second elongated arm pivotably coupled near proximal-end portions of the first elongated arm and the second elongated arm;
   a biasing member inserted between the first elongated arm and the second elongated arm urging the first elongated arm and second elongated arm apart;
   wherein each of the first elongated arm and the second elongated arm has an enlarged distal-end portion sized and shaped for manipulating food thereby defining a head;
   a clasp assembly pivotably coupled to the first elongated arm by a first pin, the first pin laterally traversing a medial portion of the first elongated arm and through the clasp assembly thereby securing the clasp assembly to the first elongated arm and providing rotation of the clasp assembly about an axis of the first pin, the clasp assembly partially disposed through a first aperture disposed on the first elongated arm, whereby the clasp assembly is rotatably operable through the first aperture, wherein the clasp assembly further comprises a claw, the claw secured within the clasp assembly at a proximal-end portion of the claw by the first pin providing rotation of the claw during rotation of the clasp assembly and a distal-end portion of the claw having a hook disposed thereupon;
   a second pin disposed upon the second elongated arm sized and shaped to releasably retain the hook; thereon, the hook engageable upon the second pin, such that the first elongated arm and the second elongated arm are releasably retained in a closed position.

2. The locking tong of claim 1, wherein lateral slots traverse at least one of the heads.

3. The locking tong of claim 1, wherein a repeating arcuate edge is formed into a side of at least one of the heads.

4. The locking tong of claim 1, wherein portions of silicone overmold about the distal-end portion of the first elongated arm and the second elongated arm enclosing a significant portion of the heads.

5. The locking tong of claim 1, wherein the head of the second elongated arm has an enlarged cross-section at a proximal end thereof sized and shaped to aid in manipulation of food.

6. The locking tong of claim 1, wherein an interior face of at least one of the heads has a modified surface treatment disposed thereupon to increase a holding force of the head upon a food, with the surface treatment being selected from at least one of the following: an emboss, a detent, a pattern of embosses, and a pattern of detents.

7. The locking tong of claim 1, wherein the claw further comprises a biasing member urging the hook towards the clasp assembly.

8. The locking tong of claim 1, wherein the proximal-end portion of the second elongated arm is substantially disposed within the proximal-end portion of the first elongated arm.

9. The locking tong of claim 1, wherein a second aperture is disposed within the proximal end portion of first elongated arm.

10. The locking tong of claim 1, wherein the first elongated arm and the second elongated arm are elongated channels having a substantially c-shaped cross-section.

11. A locking tong comprising: a first elongated arm having a proximal end portion and a distal end portion; a second elongated arm having a proximal end portion and a distal end portion, wherein the first elongated arm and second elongated arm are pivotably coupled to each other at the proximal end portions of the first elongated arm and the second elongated arm;

a clasp assembly pivotably coupled on a medial portion of the first elongated arm, the clasp assembly operable to engage the second elongated arm such that the engaged clasp assembly prevents the first elongated arm from pivoting towards and away from the second elongated arm;

wherein the clasp assembly is pivotably coupled to the first elongated arm by a first pin, the first in laterally traversing a medial portion of the first elongated arm and through the clasp assembly thereby securing the clasp assembly to the first elongated arm and providing rotation of the clasp assembly about an axis of the first pin; and wherein the clasp assembly is partially disposed through a first aperture disposed on the first elongated arm, whereby the clasp assembly is rotatably operable through the first aperture.

12. The locking tong of claim 11, wherein a biasing member near the proximal end portions of the first elongated arm and the second elongated arm pivotably urges the first elongated arm apart from the second elongated arm.

13. The locking tong of claim 11, wherein the clasp assembly has a distal end and a proximal end, the clasp assembly pivotably coupled to the first elongated arm at the proximal end, the distal end of the clasp assembly having a hook thereupon.

14. The locking tong of claim 13, wherein the hook of the clasp assembly engages a second pin on the second elongated arm, the second pin disposed on a medial portion of the second elongated arm, wherein the second pin is sized and shaped to releasably retain the hook.

15. The locking tong of claim 11, wherein the first elongated arm and the second elongated arm are elongated channels having a substantially c-shaped cross section.

16. The locking tong of claim 11, wherein the proximal end portion of the second elongated arm is substantially disposed within the proximal end portion of the first elongated arm.

17. The locking tong of claim 11, wherein each of the distal end of the first elongated arm and the distal end of the second elongated arm has an enlarged portion sized and shaped for manipulating objects thereby defining a head.

18. The locking tong of claim 17, wherein an interior face of at least one of the heads has a modified surface treatment disposed thereupon to increase a holding force of the head upon an object, with the surface treatment being selected from one of the following: an emboss, a detent, a pattern of embosses, and a pattern of detents.

* * * * *